United States Patent
Lo

(10) Patent No.: US 7,979,587 B1
(45) Date of Patent: *Jul. 12, 2011

(54) APPARATUS AND METHOD FOR AUTOMATIC SPEED DOWNSHIFT FOR A TWO PAIR CABLE

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/624,522

(22) Filed: Nov. 24, 2009

Related U.S. Application Data

(63) Continuation of application No. 09/991,043, filed on Nov. 21, 2001, now Pat. No. 7,624,197.

(60) Provisional application No. 60/256,535, filed on Dec. 18, 2000.

(51) Int. Cl.
*G06F 15/16* (2006.01)

(52) U.S. Cl. ........................................ 709/250; 709/233

(58) Field of Classification Search .................. 709/233, 709/250

See application file for complete search history.

(56) References Cited

U.S. PATENT DOCUMENTS

| | | | |
|---|---|---|---|
| 5,410,535 A | 4/1995 | Yang et al. | |
| 5,414,708 A | 5/1995 | Webber et al. | |
| 5,577,023 A | 11/1996 | Marum et al. | |
| 5,809,026 A | 9/1998 | Wong et al. | |
| 5,841,985 A | 11/1998 | Jie et al. | |
| 5,892,926 A | 4/1999 | Witkowski et al. | |
| 5,923,663 A | 7/1999 | Bontemps et al. | |
| 5,936,963 A | 8/1999 | Saussy | |
| 5,991,885 A | 11/1999 | Chang et al. | |
| 6,072,803 A | 6/2000 | Allmond et al. | |
| 6,085,241 A | 7/2000 | Otis | |
| 6,148,025 A | 11/2000 | Shirani et al. | |
| 6,169,475 B1 | 1/2001 | Browning | |
| 6,175,865 B1 | 1/2001 | Dove et al. | |
| 6,243,756 B1 | 6/2001 | Whitmire et al. | |
| 6,272,552 B1 | 8/2001 | Melvin et al. | |
| 6,332,166 B1 | 12/2001 | Cranford et al. | |
| 6,377,640 B2 * | 4/2002 | Trans | 375/354 |
| 6,529,957 B1 | 3/2003 | Joergensen | |
| 6,556,589 B2 | 4/2003 | McRobert et al. | |
| 6,898,185 B1 * | 5/2005 | Agazzi et al. | 370/241 |
| 6,928,106 B1 | 8/2005 | Agazzi | |
| 7,161,911 B1 | 1/2007 | Fang et al. | |
| 7,173,431 B1 | 2/2007 | Lo et al. | |
| 7,190,172 B1 | 3/2007 | Lo et al. | |
| 7,624,197 B1 * | 11/2009 | Lo | 709/250 |

(Continued)

FOREIGN PATENT DOCUMENTS

EP 00273080 A1 7/1988

(Continued)

*Primary Examiner* — Douglas B Blair

(57) ABSTRACT

A physical layer of a device is connected to a plurality of twisted pairs of wire. The physical layer includes an autonegotiation controller that initially advertises a plurality of operating speeds associated with the device and receives a request for the device to operate at a first operating speed. A cable detector determines whether the physical layer is connected to a sufficient number of twisted pair wires to support the first operating speed. A speed adjuster alters the plurality of operating speeds advertised by the autonegotiation controller in response to the physical layer not being connected to a sufficient number of twisted pair wires to support the first operating speed. The speed adjuster alters the plurality of operating speeds advertised by the autonegotiation controller by masking one of the plurality of operating speeds corresponding to the first operating speed.

7 Claims, 3 Drawing Sheets

U.S. PATENT DOCUMENTS

| | | | |
|---|---|---|---|
| 7,711,999 B2 * | 5/2010 | Agazzi et al. | 714/724 |
| 2008/0155326 A1 | 6/2008 | Agazzi et al. | |
| 2010/0192028 A1 * | 7/2010 | Agazzi et al. | 714/712 |

FOREIGN PATENT DOCUMENTS

| | | |
|---|---|---|
| EP | 00577435 A1 | 7/1993 |
| EP | 00596523 A2 | 5/1994 |
| EP | 00596523 A3 | 1/1996 |
| EP | 00577435 B1 | 2/1999 |
| WO | 9413072 A1 | 6/1994 |
| WO | 9619877 A1 | 6/1996 |
| WO | 0054419 A1 | 9/2000 |

* cited by examiner

«APPARATUS AND METHOD FOR AUTOMATIC SPEED DOWNSHIFT FOR A TWO PAIR CABLE»

CROSS-REFERENCE TO RELATED APPLICATIONS

This application is a continuation of U.S. patent application Ser. No. 09/991,043, filed Nov. 21, 2001, which claims the benefit of U.S. Provisional Application No. 60/256,535, filed Dec. 18, 2000, which are hereby incorporated by reference.

FIELD OF THE INVENTION

The present invention relates to networks, and more particularly to autonegotiation controllers within the physical layer of devices that are connected to an Ethernet network.

BACKGROUND OF THE INVENTION

Referring now to FIG. 1, first and second devices 10 and 12 include physical layers 14-1 and 14-2 that are connected by cable 18 that includes four pairs of twisted pair wires (A, B, C and D). The physical layers 14 usually include digital signal processors (DSPs) and autonegotiation controllers (both not shown). The DSP of the first device receives and decodes signals from the second device. The DSP of the first device codes and transmits signals to the second device. The four pairs of twisted pair wires are typically labeled A (1,2), B (3, 6), C (4,5), and D (7,8). In 10BASE-T and 100BASE-TX mode, only pairs A (1,2) and B (3,6) are required to autonegotiate and to establish a link. In 1000BASE-T mode, however, two pairs of twisted pair wires are required to autonegotiate and four pairs are required to establish a link.

In 10BASE-T, 100BASE-TX, and 1000BASE-T modes, the physical layer performs autonegotiation before a link is established. During autonegotiation, the devices 10 and negotiate the operating speed of the link as well as other functional capabilities of the devices. A device can advertise operating speeds that are less than or equal to the maximum operating speed of the device.

Compliant cable for Ethernet over twisted pair cables requires four pairs of twisted pair wires to be available even if they are not used. Referring now to FIG. 2, in some situations (for example due to cost or malfunctions), cable 20 provides only two operable pairs of twisted pair wires and is therefore non-compliant. The 1000BASE-T mode cannot establish a link over the non-compliant cable 20. However, 1000BASE-T autonegotiation on the non-complaint cable can be completed successfully. When the two devices attempt to establish the 1000BASE-T link, the link fails because only two pairs of twisted pair wires are available. The devices cycle through successful autonegotiation and unsuccessful link modes and are never able to exchange data.

To establish the 1000BASE-T link over compliant cable, the following steps are usually performed. In a first step, autonegotiation determines that both devices have 1000BASE-T capability. One device is designated the master device and the other device is designated the slave device. In a second step, after autonegotiation completes, the master device begins transmitting on all four pairs. Embedded in the transmit signal is an indication that the master device has not locked onto the transmit signal of the slave device. The slave device recovers the data on all four pairs of twisted pair wires. During the recovery time, the slave device does not transmit any data.

In a third step, after the slave locks onto the transmit signal of the master device and before starting echo cancellation, the slave device begins transmitting on all four pairs of twisted pair wires. Embedded in the transmit signal of the slave device is an indication that the slave device has not locked onto the transmit signal of the master device. In other words, the slave device has not completed echo cancellation. In a fourth step, both the master and slave devices transmit on all four pairs of twisted pair wires. The master and the slave devices perform echo cancellation and recover the data from each other. Once echo cancellation is complete and both devices lock onto the transmit signals, both devices transmit an indication that they are locked and ready to transmit and receive data. Then, the link is brought up. The DSP of each device must be locked onto the signals and the coding on all four pairs of twisted pair wires must be correct before the indication is sent.

If the second to fourth steps do not complete within a predetermined amount of time, the master and/or slave device times out and stops transmitting. Control returns to the first step. The time limit is usually governed by a maxwait timer in the autonegotiation controller.

To recover the incoming signals, the DSPs in the master and slave devices perform the following steps: When a transmit signal is detected on the twisted pair wire, the DSP starts tracking the incoming transmit signal. The DSP equalizes the transmit signal and locates an ideal sampling point to capture the transmit signal. The sampling process requires some time to complete before the DSP locks onto the transmit signal. During the sampling and locking process, the error rate decreases as the DSP converges to the ideal sampling point and locks onto the transmit signal.

Once the signal is locked, a physical coding sublayer (PCS) circuit of the DSP determines whether the incoming signal was encoded correctly to determine the validity of the incoming signal. It is possible for the DSP to lock onto a signal that was incorrectly encoded. An example in 1000BASE-T encoding is a signal that is all 0's. Since 0 is a valid signal level, the DSP will lock onto the 0. Since there are no transitions in the signal, any sampling point is the ideal sampling point. Since 1000BASE-T coding does not allow a signal to remain at 0 indefinitely, the coding of the received signal must be checked to determine the validity of the recovered signal.

SUMMARY OF THE INVENTION

A physical layer according to the invention of a first network device is connected to cable of an Ethernet network. A digital signal processor (DSP) is coupled to the cable. The DSP receives and decodes first signals on the cable from a second device. The DSP codes and transmits second signals to the second device on the cable. An autonegotiation controller communicates with the DSP and includes a cable detector that determines a first number of pairs of twisted pair wires of the cable that are operable.

In other features of the invention, the autonegotiation controller includes a speed adjuster that masks an advertised speed of the first device when the cable detector determines that the first number is equal to two and that a first speed is requested by the first device. The speed adjuster does not mask the advertised speed of the first device when the first number is four. The speed adjuster also does not mask the advertised speed when the requested speed is less than the first speed.

In still other features, the speed adjuster increments a first counter when the cable detector determines that the first number is equal to two and autonegotiation fails. The speed adjuster resets and sets the first counter equal to zero when the first counter is equal to a first limit.

In still other features, the cable detector includes a maxwait timer and has a first state. The cable detector transitions from the first state to a second state when the DSP receives signals on at least one of a first pair and a second pair of twisted pair wires. The cable detector transitions from the second state to a third state when the DSP receives and decodes signals on the first and second pairs of twisted pair wires. The cable detector transitions from the second state to a fourth state when the DSP receives signals on at least one of the first and second pairs but not the third and fourth pairs and the maxwait timer times out.

In yet other features of the invention, the cable detector transitions from the third state to the fourth state when the DSP receives and decodes signals on the first and second pairs but does not receive signals on the third and fourth pairs and the maxwait timer times out. The cable detector includes a slave counter that is incremented each time the cable detector transitions to the fourth state. The cable detector returns to the first state when the slave counter is less than slimit and the cable detector sets the first number equal to two when the slave counter equals slimit.

In still other features, the cable detector transitions from the first state to a fifth state when the maxwait timer times out and the DSP fails to detect signals on the first pair and the second pair. The cable detector includes a master counter that is incremented each time that the cable detector transitions to the fifth state.

In still other features, the cable detector returns to the first state when the master counter is less than mlimit and the cable detector sets the first number equal to two when the master counter equals mlimit. The cable detector sets the first number equal to four when the DSP receives and decodes signals on the first, second, third and fourth pairs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

An autonegotiation controller according to the present invention advantageously breaks the cycling between successful autonegotiation and unsuccessful link establishment modes. The autonegotiation controller adjusts advertised speeds to a lower speed if both devices are capable of running run at the lower speed. For example, the devices can be run in 10BASE-T and 100BASE-TX modes, which require only two pairs of twisted pair wires. Operation at the reduced speed is a better alternative than a completely disabled link.

Figure 1:
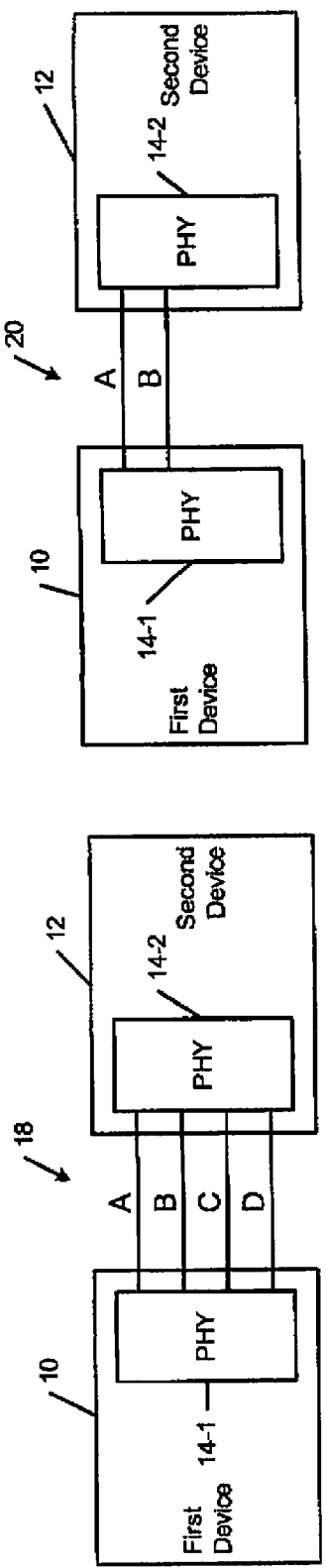
FIG. 1 illustrates two devices that are connected together by a cable plant with four pairs of twisted pair wires according to the prior art.
Figure 2:
FIG. 2 illustrates two devices that are connected together by a cable plant with two pairs of twisted pair wires according to the prior art.
Figure 3:
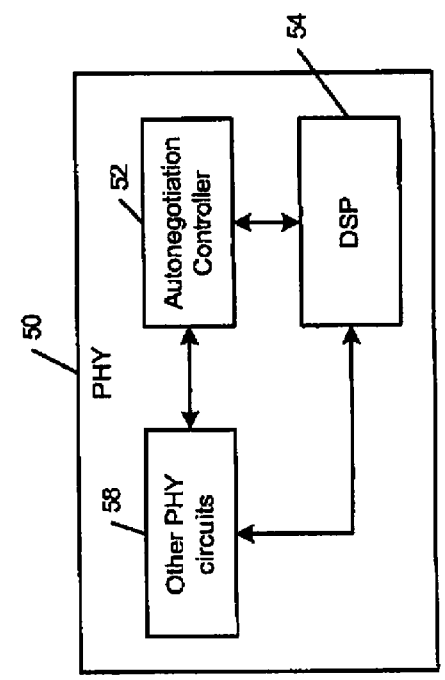
FIG. 3 is a functional block diagram of a device with a physical layer that includes an autonegotiation controller according to the present invention.

Referring now to FIG. 3, a physical layer 50 of a device includes an autonegotiation controller 52, a digital signal processor (DSP) 54 and other conventional physical layer circuits 58. The autonegotiation controller includes a cable detector 60 and a speed adjuster 64. The cable detector 60 may include one or more timers 70 such as a maxwait timer done (MTD) and/or counters 74 such as slave counter SCNT 74-1 and/or master counter MCNT 74-2. The speed detector 64 includes a counter CNT 76.

The cable detector 60 determines the number of operable pairs of twisted pair wires provided by the cable 20. The speed adjuster 64 operates after the cable detector 60 determines the number of operable pairs of twisted pair wires. The speed adjuster 64 alters the autonegotiation speed advertisement of the devices when an insufficient number of twisted pair wires are available. The speed adjuster 64 will be described initially followed by the description of the cable detector 60.

Figure 5:
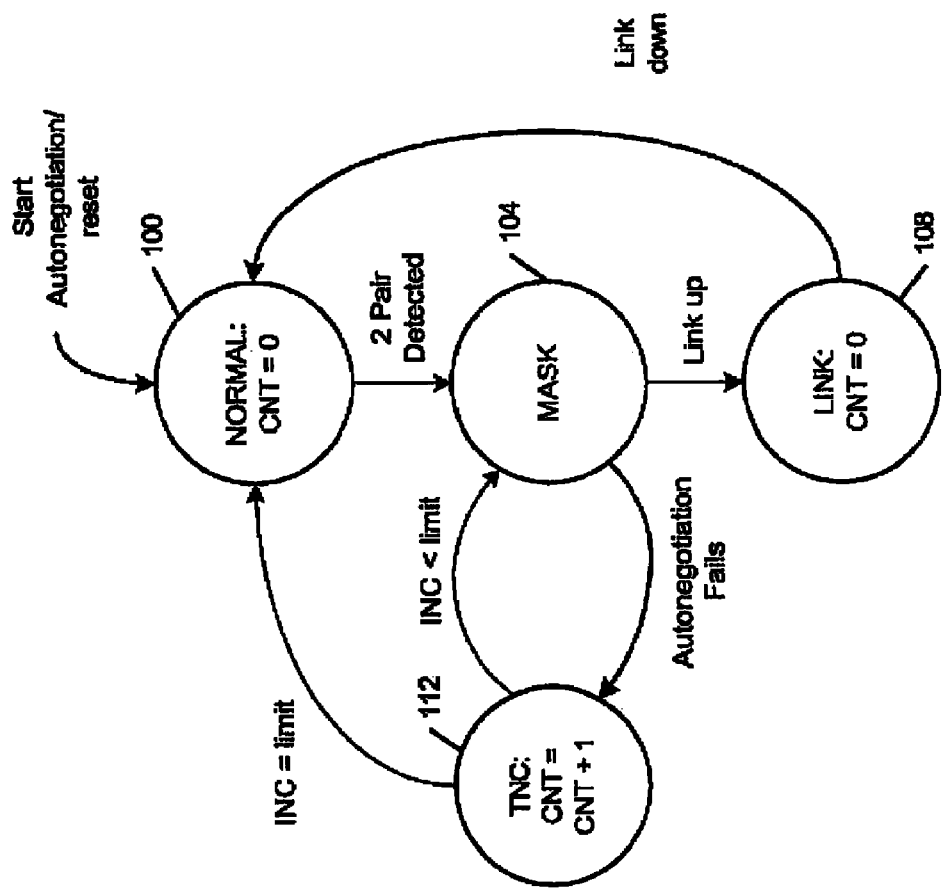
FIG. 5 is a state diagram for a speed adjuster according to the present invention.
Figure 4:
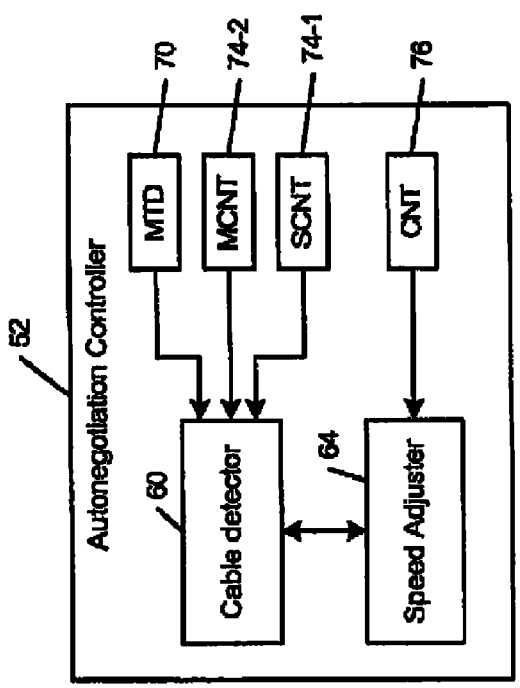
FIG. 4 illustrates the autonegotiation controller of FIG. 3 in further detail.

Referring to FIG. 5, the state operation of the speed adjuster 64 of the autonegotiation controller 52 is shown. When reset or when autonegotiation is restarted, the speed adjuster 64 moves into the NORMAL state (state 100). In the NORMAL state 100, the autonegotiation controller 52 advertises all capabilities that the devices specify. In other words, the autonegotiation controller 52 functions conventionally.

When the cable detector 60 detects that the cable only has an insufficient number of operable twisted pair wires for the requested speed, the speed adjuster 64 transitions to the MASK state (state 104). In the MASK state 104, the autonegotiation controller 52 advertises all capabilities that the user enables except for the speed advertisement. In other words, the speed capabilities are masked. Otherwise, the autonegotiation controller 52 operates conventionally. Since the speed is not advertised if autonegotiation completes successfully, the devices will operate at lower speeds. In an exemplary embodiment, when gigabit speeds are requested and an insufficient number of operable twisted pair wires are available (e.g. less than four), operation continues in 10BASE-T and 100BASE-TX modes. Skilled artisans will appreciate that the present invention can be applied to different speeds and numbers of operable twisted pair wires.

When the devices operate at the lower speed, the link will come up and the autonegotiation controller 52 moves into a LINK state (state 108). If the link is lost (possibly due to unplugging of the cable), the autonegotiation controller 52 moves back into the NORMAL state 100.

One problem is a possible error condition that occurs when autonegotiation fails to complete in the MASK state 104. To solve this problem, a TNC state (state 112) increments the counter CNT 76 to count the number of times that autonegotiation fails to complete a link. If the counter CNT 76 exceeds a predetermined limit, the autonegotiation controller 52 returns to the NORMAL state 100. Otherwise the autonegotiation controller 52 returns to the MASK state 104. Note that the counter CNT 76 is reset to 0 whenever the autonegotiation controller 52 is in the NORMAL state 100 or the LINK state 108.

Figure 6:
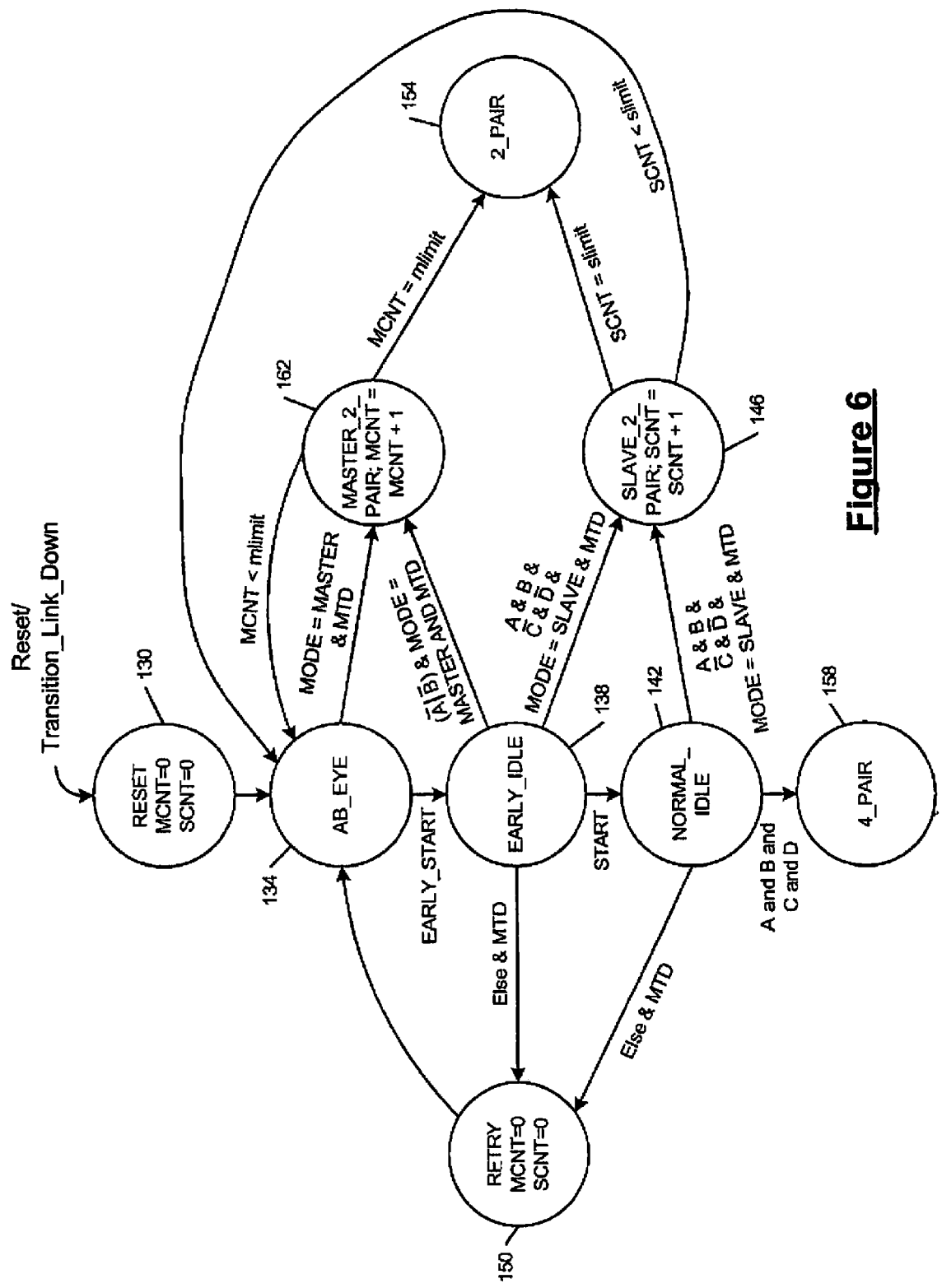
FIG. 6 is a state diagram for a cable detector according to the present invention.

Referring now to FIG. 6, a state diagram for the cable detector 60 of the autonegotiation controller 52 is shown. The cable detector 60 determines whether the cable includes two or four pairs of operable twisted pair wires. A maxwait timer done (MTD) signal is generated by the MTD timer 70. The MTD timer 70 sets the maximum time limit for the devices to establish a link. A MODE signal defines whether the device is a master M or a slave S. A, B, C, and D represent the four pairs of twisted pair wires. A and B are required for 10BASE-T and 100BASE-TX links. A, B, C, and D without a bar signifies that the designated pair was received correctly. A bar over A, B, C, and D signifies that the designated pair was received incorrectly. The twisted pair wires are referred to as A, B, C, and D rather than the pairs (1, 2) (3, 6), (4, 5), and (7, 8). In one configuration A=(1, 2) B=(3, 6), C=(4,5), and D=(7,8) and in the other configuration B=(1,2), A=(3,6), D=(4,5), C=(7,8). Using A, B, C, D allows a more simple description of the configurations.

An EARLY_START signal is generated by the DSP 54 when it has recovered the data reliably on either pairs A or B. During this time, the PCS (not shown) of the DSP begins to examine the validity of the code on the received signal. A START signal is generated by the DSP 54 to indicate that the recovered signal is reliable. In other words, the PCS of the DSP 54 determines that the coding is correct. The signal TRANSITION_LINK_DOWN is generated when the link transitions from link up to link down. Once the link is down, the TRANSITION_LINK_DOWN signal is no longer generated.

The SCNT and MCNT counters 74 track the number of times that certain events occur. Upon reset or when the TRANSITION_LINK_DOWN is asserted, the cable detector 60 enters the RESET state (state 130). The SCNT and MCNT counters 74 are cleared. Then, the cable detector 60 transitions to the AB_EYE state (state 134). The operation of the autonegotiation controller 52 depends on whether the device is a master or a slave device.

In a first example, the pairs A and B are recovered correctly by the DSP 54 and the PCS of the DSP 54 determines that the coding is correct. The pairs C and D are either not recovered correctly or are recovered correctly but have incorrect coding. If the device is a slave device, the DSP 54 will always generate the EARLY_START signal because the master device will be the first device to transmit. The autonegotiation controller moves into an EARLY_IDLE state (state 138). In this state, several things may happen. The DSP 54 can successfully recover data on the pairs A and B and the autonegotiation controller 52 will transition to a NORMAL_IDLE state (state 142) to check the received code further. The DSP 54 can successfully recover data on both pairs A and B with correct coding but cannot recover on the pairs C and D and the MTD timer 70 expires. In this case, the autonegotiation controller 52 moves into a SLAVE_2_PAIR state (state 146). In all other cases, when the MTD timer 70 times out, the autonegotiation controller 52 moves into a RETRY state (state 150).

If the autonegotiation controller 52 moves into the RETRY state 150, both MCNT and SCNT counters 74 are cleared and the autonegotiation controller 52 transitions to the AB_EYE state 134. The autonegotiation controller 52 detects a condition that prevents the receiver from locking when the received signal is not a signature of the two pair condition. Such conditions are normal because it sometimes takes the DSP 54 several attempts to link up. The clearing of the counters 74 reduces the possibility of false detection of the two pair condition.

If the autonegotiation controller 52 moves into the SLAVE_2_PAIR state 146, the SCNT counter 74 increments by 1. If SCNT counter 74 reaches a predetermined limit (slimit), the autonegotiation controller 52 transitions to a 2_PAIR state (state 154). Otherwise, the autonegotiation controller 52 transitions to the AB_EYE state 134. The limit value slimit is preferably greater than 1 to allow that the signature of the pairs A and B to be received multiple times before flagging the 2_PAIR state 154. In the 2_PAIR state 154, the autonegotiation controller 52 sets a flag signifying that a two pair condition was detected.

If the autonegotiation controller 52 is in the NORMAL_IDLE state 142, one of three possibilities can occur. If the coding on A, B, C and D is determined to be correct, then the autonegotiation controller 52 moves into a 4_PAIR state (state 158) and the device is run conventionally. If the pairs A and B have the correct coding but C and D do not have the correct coding and the MTD timer 70 expires, the autonegotiation controller 52 transitions to the SLAVE_2_PAIR state 146. If the MTD timer 70 expires and neither of the preceding conditions are met, the autonegotiation controller 52 moves into the RETRY state 150.

If the device is a master, the EARLY_START signal is not asserted if the cable includes only two pairs of twisted wire. This is because the slave device will never transmit to the master device because the slave device never recovers data on the pairs C and D (the pairs do not exist). The autonegotiation controller 52 moves into a MASTER_2_PAIR state (state 162) once the MTD timer 70 expires.

If the device is connected to four pairs of twisted pair wires, then the autonegotiation controller 52 will move through the EARLY_IDLE state 138, NORMAL_IDLE state 142, and the 4_PAIR state 158. Note that the autonegotiation controller 52 may also move into the RETRY state 150 if the DSP 54 does not successfully lock the first time, which sometimes occurs in normal operation.

If the autonegotiation controller 52 moves into the MASTER_2_PAIR state 162, the MCNT counter 74 increments by 1. If the MCNT counter 74 reaches a predetermined limit (mlimit), the autonegotiation controller 52 moves to the 2_PAIR state 154. Otherwise, the autonegotiation controller 52 transitions to the AB_EYE state. The limit value mlimit is preferably set to a number that is greater than 1 because it is possible that the slave device will not lock the first few times and will not transmit to the master. In a preferred embodiment, mlimit is set equal to 4 to minimize the chances of a false trigger.

It is possible that the DSP 54 will mistakenly lock onto the 0's on the pairs A and B and cause the EARLY_START signal to be asserted. In this case, the autonegotiation controller 52 goes to the EARLY_IDLE state 138. Since the coding on the pairs A and B is incorrect, autonegotiation controller 52 transitions to the MASTER_2_PAIR state 162 to detect the condition that the slave is not transmitting when the MTD timer 70 expires.

Skilled artisans will appreciate that the autonegotiation controller can be implemented as an application specific integrated circuit (ASIC), an analog circuit, a digital circuit, software executed by a processor and memory, or in any other suitable manner.

Thus it will be appreciated from the above that as a result of the present invention, a system and method for automatically controlling the transmission rate at which an Ethernet cable is operated is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting.

What is claimed is:

1. A physical layer of a device, the physical layer configured to be connected to a plurality of twisted pairs of wire, the physical layer comprising:
   an autonegotiation controller configured to
      initially advertise a plurality of operating speeds associated with the device, and
      receive a request for the device to operate at a first operating speed, the first operating speed corresponding to one of the plurality of operating speeds initially advertised by the autonegotiation controller;
   a cable detector configured to determine whether the physical layer is connected to a sufficient number of twisted pair wires to support the first operating speed; and
   a speed adjuster configured to alter the plurality of operating speeds advertised by autonegotiation controller in response to the physical layer not being connected to a sufficient number of twisted pair wires to support the first operating speed, the speed adjuster to alter the plurality of operating speeds advertised by the autonegotiation controller by
      masking the one of the plurality of operating speeds corresponding to the first operating speed from being advertised by the autonegotiation controller.

2. The physical layer of claim 1, further comprising a digital signal processor configured to:
   encode signals to be transmitted from the device; and
   decode signals received by the device.

3. The physical layer of claim 1, wherein the plurality of twisted pairs of wire consist of four pairs of twisted pairs of wire.

4. The physical layer of claim 3, wherein the four pairs of twisted pairs of wire support each of a 10BASE-T mode of operation, a 100BASE-TX mode of operation, and a 1000BASE-T mode of operation.

5. A method for establishing an operating speed for a device, the device having a physical layer connected to a plurality of twisted pairs of wire, the method comprising:
   initially advertising a plurality of operating speeds associated with the device;
   receiving a request for the device to operate at a first operating speed, the first operating speed corresponding to one of the plurality of operating speeds initially advertised;
   determining whether the physical layer is connected to a sufficient number of twisted pair wires to support the first operating speed; and
   altering the plurality of operating speeds advertised in response to the physical layer not being connected to a sufficient number of twisted pair wires to support the first operating speed, wherein altering the plurality of operating speeds advertised comprises
      masking the one of the plurality of operating speeds corresponding to the first operating speed from being advertised.

6. The method of claim 5, wherein the plurality of twisted pairs of wire consist of four pairs of twisted pairs of wire.

7. The method of claim 6, wherein the four pairs of twisted pairs of wire support each of a 10BASE-T mode of operation, a 100BASE-TX mode of operation, and a 1000BASE-T mode of operation.

* * * * *